United States Patent
He et al.

(10) Patent No.: US 12,085,233 B2
(45) Date of Patent: Sep. 10, 2024

(54) HYDROGEN FUELING CONTROL DEVICE AND METHOD

(71) Applicant: National Institute of Clean-and-Low-Carbon Energy, Beijing (CN)

(72) Inventors: Guangli He, Beijing (CN); Kang Yang, Beijing (CN); Qiang Guo, Beijing (CN); Yujian Fan, Beijing (CN); Zhuang Xu, Beijing (CN)

(73) Assignee: National Institute of Clean-and-Low-Carbon Energy (CN)

( * ) Notice: Subject to any disclaimer, the term of this patent is extended or adjusted under 35 U.S.C. 154(b) by 660 days.

(21) Appl. No.: 17/278,060

(22) PCT Filed: Mar. 14, 2019

(86) PCT No.: PCT/CN2019/078146
§ 371 (c)(1),
(2) Date: Mar. 19, 2021

(87) PCT Pub. No.: WO2020/057069
PCT Pub. Date: Mar. 26, 2020

(65) Prior Publication Data
US 2021/0348722 A1    Nov. 11, 2021

(30) Foreign Application Priority Data
Sep. 21, 2018   (CN) .......................... 201811108937.5

(51) Int. Cl.
*F17C 13/02* (2006.01)
*F17C 5/06* (2006.01)
(Continued)

(52) U.S. Cl.
CPC .............. *F17C 5/06* (2013.01); *F17C 13/003* (2013.01); *F17C 13/025* (2013.01);
(Continued)

(58) Field of Classification Search
CPC ........ F17C 5/06; F17C 13/003; F17C 13/025; F17C 13/026; F17C 13/028;
(Continued)

(56) References Cited

U.S. PATENT DOCUMENTS

| 8,708,005 | B2 | 4/2014 | Mori |
| 8,783,303 | B2 | 7/2014 | Harty et al. |

(Continued)

FOREIGN PATENT DOCUMENTS

| CN | 201495193 U | 6/2010 |
| CN | 101832467 A | 9/2010 |

(Continued)

OTHER PUBLICATIONS

Extended European Search Report including Written Opinion for Application No. 19862883.6 dated Apr. 26, 2022, pp. 1-8.

*Primary Examiner* — Jason K Niesz
(74) *Attorney, Agent, or Firm* — Lerner David LLP (57) ABSTRACT

A hydrogen fueling control device and method comprising step S100, obtaining initial parameters of a vehicle-mounted hydrogen reservoir, wherein the initial parameters comprise volume, initial hydrogen pressure, and initial ambient temperature of the vehicle-mounted hydrogen reservoir; step S200, computing a fueling rate and a target pressure for hydrogen fueling according to the initial parameters, wherein the computed fueling rate and target pressure cause the temperature of hydrogen during a hydrogen fueling process to be within a preset safe range; and step S300, controlling a hydrogen fueling station to fuel hydrogen to the vehicle-mounted hydrogen reservoir at the computed fueling rate to the computed target pressure. The control method controls a fueling process by obtaining a fueling rate and a target pressure by means of initial parameters of a vehicle-mounted hydrogen reservoir measured by a hydro- (Continued)

gen fueling station, without requiring the real-time communication between the hydrogen fueling station and a vehicle.

12 Claims, 4 Drawing Sheets

(51) Int. Cl.
*F17C 13/00* (2006.01)
*G05B 13/04* (2006.01)

(52) U.S. Cl.
CPC .......... *F17C 13/026* (2013.01); *F17C 13/028* (2013.01); *G05B 13/042* (2013.01); *F17C 2221/012* (2013.01); *F17C 2250/0426* (2013.01); *F17C 2250/043* (2013.01); *F17C 2250/0439* (2013.01); *F17C 2250/0636* (2013.01); *F17C 2250/0694* (2013.01); *F17C 2265/065* (2013.01); *F17C 2270/0139* (2013.01)

(58) Field of Classification Search
CPC ........ F17C 2221/012; F17C 2250/0426; F17C 2250/043; F17C 2250/0439; F17C 2250/0636; F17C 2250/0694; F17C 2265/065; F17C 2270/0139; B05B 13/042
See application file for complete search history.

(56) References Cited

U.S. PATENT DOCUMENTS

| | | |
|---|---|---|
| 9,279,541 B2 | 3/2016 | Cohen |
| 9,605,804 B2 | 3/2017 | Mathison |
| 10,041,628 B2 | 8/2018 | Otaki et al. |
| 2013/0037165 A1* | 2/2013 | Okawachi ............ F17C 13/026 141/83 |
| 2013/0263969 A1* | 10/2013 | Barth ........................ F17C 5/06 141/82 |
| 2014/0174593 A1* | 6/2014 | Ammouri ................ F17C 5/06 141/4 |
| 2014/0196814 A1* | 7/2014 | Nagura ................ F17C 13/026 141/82 |
| 2014/0338393 A1 | 11/2014 | Sethna et al. |
| 2017/0074707 A1 | 3/2017 | Mathison |
| 2017/0114958 A1 | 4/2017 | Otaki et al. |
| 2018/0066799 A1* | 3/2018 | Ravinel .................... F17C 7/00 |
| 2018/0205102 A1* | 7/2018 | O'Brien .................... F17C 7/00 |
| 2018/0216877 A1 | 8/2018 | Dabkowski et al. |
| 2018/0356270 A1 | 12/2018 | Mathison |

FOREIGN PATENT DOCUMENTS

| | | |
|---|---|---|
| CN | 103438349 A | 12/2013 |
| CN | 205616848 A | 10/2016 |
| CN | 205810848 U | 12/2016 |
| CN | 106609911 A | 5/2017 |
| CN | 107202243 A | 9/2017 |
| CN | 207298363 U | 5/2018 |
| CN | 108332046 A | 7/2018 |
| JP | 2002544397 A | 12/2002 |
| JP | 2013527390 A | 6/2013 |
| JP | 2017078473 A | 4/2017 |
| KR | 20170046590 A | 5/2017 |
| WO | 0070262 A1 | 11/2000 |
| WO | 2011133296 A1 | 10/2011 |

* cited by examiner

HYDROGEN FUELING CONTROL DEVICE AND METHOD

CROSS REFERENCE TO RELATED APPLICATIONS

This application is a 35 USC § 371 national stage application of PCT/CN2019/078146, which was filed Mar. 14, 2019, is titled HYDROGEN FUELING CONTROL DEVICE AND METHOD, and claims priority to CN 201811108937.5, filed Sep. 21, 2018, both of which are incorporated herein by reference as if fully set forth.

FIELD OF THE INVENTION

The present invention relates to the technical field of hydrogen filling, in particular to a hydrogen filling control device and method.

BACKGROUND OF THE INVENTION

Hydrogen energy is considered to be one of the most promising secondary energy sources due to its outstanding advantages such as diverse sources, cleanness, environment friendliness, and large-scale storage and transportation. Hydrogen fuel cell vehicles are one of the important application terminals of hydrogen energy, and many automotive giants in the world have launched mass-produced hydrogen fuel cell vehicles around 2015. The current research on hydrogen fuel cell vehicles is multifaceted, but the filling control strategy for filling on-board hydrogen storage devices with hydrogen from hydrogen filling stations (hereafter referred to as hydrogen filling control strategy) is undoubtedly one of the main focuses of research at home and abroad.

One of the main technical problems that the existing hydrogen filling control strategy wants to solve is how to control the hydrogen temperature of the hydrogen storage device of the vehicle to be under the requirement of international standard (usually below 85° C.) in the filling process to prevent hydrogen explosion and ensure safe use of hydrogen. Various methods for controlling the hydrogen temperature are disclosed in the prior art. Among them, the most important method is to control the hydrogen filling rate according to the temperature or pressure fed back from the on-board hydrogen storage device in real time to adjust the hydrogen temperature. However, this method relies on the communication relationship between the vehicle and the hydrogen filling station, and the hydrogen filling station needs to determine the hydrogen filling strategy based on the temperature signal or pressure signal, sent by the vehicle, of the hydrogen storage device. But in practice, the same vehicle will be filled with hydrogen at different types of hydrogen filling stations, the same hydrogen filling station will also provide hydrogen filling services to different types of vehicles, and different types of vehicles or hydrogen filling stations often have different communication standards, so that it is difficult to achieve communication between vehicles and hydrogen filling stations. Thereby, in the case that the vehicle and the hydrogen filling station cannot communicate, the solution in the prior art of controlling the hydrogen filling rate according to the temperature or pressure fed back from the on-board hydrogen storage device in real time to adjust the hydrogen temperature is also difficult to achieve.

SUMMARY OF THE INVENTION

An objective of embodiments of the present invention is to provide a hydrogen filling control device and method to at least solve in part the above technical problem.

In order to achieve the above objective, embodiments of the present invention provide a hydrogen filling control method, comprising: acquiring initial parameters of an on-board hydrogen storage device, the initial parameters comprising a volume, an initial hydrogen pressure and an initial ambient temperature of the on-board hydrogen storage device; calculating a filling rate and a target pressure of hydrogen filling according to the initial parameters, wherein the calculated filling rate and target pressure enable a hydrogen temperature of a hydrogen filling process to be within a preset safe range; and controlling a hydrogen filling station to fill the on-board hydrogen storage device with hydrogen to the calculated target pressure at the calculated filling rate.

Optionally, the acquiring the initial parameters of an on-board hydrogen storage device comprises: scanning a tag on the on-board hydrogen storage device to read volume information, stored in the tag, of the on-board hydrogen storage device; and/or acquiring the initial hydrogen pressure and the initial ambient temperature respectively detected by a pressure sensor and a temperature sensor.

Optionally, the initial parameters further comprise the hydrogen temperature of the on-board hydrogen storage device. Optionally, the initial parameters further comprise a material, a wall thickness and size information of the on-board hydrogen storage device.

Optionally, the calculating the filling rate and the target pressure of the hydrogen filling comprises calculating the filling rate and the target pressure by using any one of a table lookup method, a formula calculation method and a pressure difference calculation method as follows:

the table lookup method, comprising: constructing a corresponding physical model of the on-board hydrogen storage device based on the initial parameters; and looking up an optimal hydrogen filling strategy corresponding to the current physical model of the on-board hydrogen storage device in a pre-configured hydrogen filling strategy table, wherein the hydrogen filling strategy table is configured according to historical hydrogen filling data of various hydrogen filling stations, and shows the mapping relationship between physical models of various on-board hydrogen storage devices and corresponding optimal hydrogen filling strategies, wherein the optimal hydrogen filling strategy comprises determining the filling rate and the target pressure;

the formula calculation method, comprising: analyzing the initial parameters and the historical hydrogen filling data to fit control parameter calculation formulae for calculating optimal hydrogen filling control parameters based on the initial parameters, wherein the optimal hydrogen filling control parameters comprise the filling rate and the target pressure; and calculating, regarding the initial parameters of the current hydrogen filling process, the corresponding optimal hydrogen filling control parameters based on the control parameter calculation formulae; and the pressure difference calculation method, comprising: determining the required filling rate according to the parameters such as the volume and the ambient temperature of the on-board hydrogen storage device; calculating a pressure difference for maintaining the required filling rate; and performing hydrogen filling according to the calculated pressure difference.

Embodiments of the present invention further provide a hydrogen filling control device, comprising: an initial parameter acquisition module, used for acquiring initial parameters of an on-board hydrogen storage device, the initial parameters comprising a volume, an initial hydrogen pressure and an initial ambient temperature of the on-board hydrogen storage device; a target parameter calculation module, used for calculating a filling rate and a target pressure of hydrogen filling according to the initial parameters, wherein the calculated filling rate and target pressure enable a hydrogen temperature of a hydrogen filling process to be within a preset safe range; and a control module, used for controlling a hydrogen filling station to fill the on-board hydrogen storage device with hydrogen to the calculated target pressure at the calculated filling rate.

Optionally, the initial parameter acquisition module comprises: a scanning submodule, used for scanning a tag on the on-board hydrogen storage device to read volume information, stored in the tag, of the on-board hydrogen storage device; or an acquisition submodule, used for acquiring the initial hydrogen pressure and the initial ambient temperature respectively detected by a pressure sensor and a temperature sensor.

Optionally, the initial parameters further comprise the hydrogen temperature of the on-board hydrogen storage device. Optionally, the initial parameters further comprise a material, a wall thickness and size information of the on-board hydrogen storage device.

Optionally, the calculation module comprises any one of submodules as follows:
- a table lookup submodule, configured to: construct a corresponding physical model of the on-board hydrogen storage device based on the initial parameters; and look up an optimal hydrogen filling strategy corresponding to the current physical model of the on-board hydrogen storage device in a pre-configured hydrogen filling strategy table, wherein the hydrogen filling strategy table is configured according to historical hydrogen filling data of various hydrogen filling stations, and shows the mapping relationship between physical models of various on-board hydrogen storage devices and corresponding optimal hydrogen filling strategies, wherein the optimal hydrogen filling strategy comprises determining the filling rate and the target pressure;
- a formula calculation submodule, configured to: analyze the initial parameters and the historical hydrogen filling data to fit control parameter calculation formulae for calculating optimal hydrogen filling control parameters based on the initial parameters, wherein the optimal hydrogen filling control parameters comprise the filling rate and the target pressure; and calculate, regarding the initial parameters of the current hydrogen filling process, the corresponding optimal hydrogen filling control parameters based on the control parameter calculation formulae; and
- a pressure difference calculation submodule, configured to: determine the required filling rate according to the parameters such as the volume and the ambient temperature of the on-board hydrogen storage device; calculate a pressure difference for maintaining the required filling rate; and perform hydrogen filling according to the calculated pressure difference.

Optionally, the hydrogen filling control device further comprises: a database module, used for storing the historical hydrogen filling data, the hydrogen filling strategy table and the control parameter calculation formulae.

An embodiment of the present invention further provides a machine-readable storage medium. The machine-readable storage medium stores an instruction for making a machine execute the above hydrogen filling control method.

An embodiment of the present invention further provides a processor for running a program. The program is used for executing the above hydrogen filling control method when being run.

An embodiment of the present invention further provides computer equipment, comprising: one or more processors; and a memory, used for storing one or more programs, wherein when the one or more programs are executed by the one or more processors, the one or more processors are made to implement the above hydrogen filling control method.

Through the above technical solutions, according to the embodiments of the present invention, the filling process is controlled by obtaining the filling rate and the target pressure based on the initial parameters, measured by the hydrogen filling station, of the on-board hydrogen storage device without the need for real-time communication between the hydrogen filling station and the vehicle, so the flow is simple and easy to implement, and the reliability of the hydrogen filling process is ensured.

Other features and advantages of the embodiments of the present invention will be described in detail in the Detailed Description of the Embodiments below.

BRIEF DESCRIPTION OF DRAWINGS

The accompanying drawings are intended to provide a further understanding of the embodiments of the present invention and constitute a part of the specification. They are used to explain the embodiments of the present invention together with the Detailed Description of the Embodiments below, but do not constitute a limitation to the embodiments of the present invention. In the accompanying drawings.

DESCRIPTION OF THE REFERENCE SIGNS

100 Initial parameter acquisition module
200 Target parameter calculation module
300 Control module
110 Scanning submodule
120 Acquisition submodule

210 Table lookup submodule
220 Formula calculation submodule
230 Pressure difference calculation submodule Detailed Description of the Embodiments Specific implementations of embodiments of the present invention will be described in detail below in conjunction with the accompanying drawings. It should be understood that the specific implementations described herein are merely illustrative of the embodiments of the present invention and are not intended to limit the embodiments of the present invention.

Embodiment I

Figure 1:
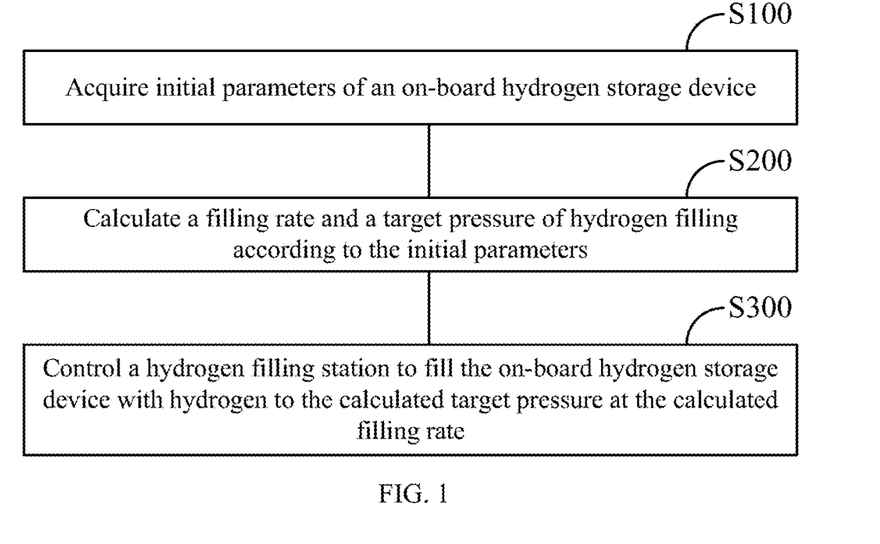
FIG. 1 is a schematic flow chart of a hydrogen filling control method according to Embodiment I of the present invention.

FIG. 1 is a schematic flow chart of a hydrogen filling control method according to Embodiment I of the present invention. As shown in FIG. 1, the hydrogen filling control method can comprise the following steps:

Step S100, initial parameters of an on-board hydrogen storage device are acquired. In this embodiment, the initial parameters comprise a volume, an initial hydrogen pressure and an initial ambient temperature of the on-board hydrogen storage device. The three parameters will be described in detail below.

Regarding the volume of the on-board hydrogen storage device, there are currently various volumes of hydrogen storage cylinders in the market, such as 100 L and 200 L. However, in the existing hydrogen filling process, the volume of the hydrogen storage cylinder is usually not considered. To ensure that the temperature rise of hydrogen is not too fast, whether for a 100 L hydrogen storage cylinder or a 200 L hydrogen storage cylinder, for example, the hydrogen filling time is set as 10 minutes. But in fact, for a 50 L hydrogen storage cylinder, it may only take 2 minutes to fill with hydrogen while the temperature rise is within the normal range. Therefore, different from the existing hydrogen filling process, in the embodiment of the present invention, the volume of the on-board hydrogen filling device is considered as an important parameter affecting the hydrogen filling process, and its application will be described in detail below and will not be repeated here.

In a preferred embodiment, a tag on the on-board hydrogen storage device can be scanned to read volume information, stored in the tag, of the on-board hydrogen storage device. The tag is, for example, a QR code, which can store equipment information of the on-board hydrogen storage device of the vehicle, such as model, volume, material, size and the like. In other embodiments, the volume of the on-board hydrogen storage device can also be obtained manually, for example, by reading the product manual of the on-board hydrogen storage device or manually observing the scale display on the on-board hydrogen storage device.

The initial hydrogen pressure refers to the pressure generated by the hydrogen that may be in the on-board hydrogen storage device before the start of hydrogen filling, for example, before the start of hydrogen filling, there is still 2 Mpa of hydrogen remaining in the on-board hydrogen storage device. The initial hydrogen pressure will affect the temperature rise. For example, when the average hydrogen flow is equal, for every 1 Mpa increase in the initial hydrogen pressure, the hydrogen temperature of the on-board hydrogen storage device (which can be expressed as the temperature of the inner wall of the on-board hydrogen storage device) drops by about 1.5 K. Therefore, in the embodiment of the present invention, the initial hydrogen pressure of the on-board hydrogen filling device is also considered as an important parameter affecting the hydrogen filling process, and its application will be described in detail below and will not be repeated here.

In a preferred embodiment, the initial hydrogen pressure of the on-board hydrogen storage device can be detected by a pressure sensor, and then a value of the initial hydrogen pressure detected by the pressure sensor can be acquired.

The initial ambient temperature refers to the ambient temperature around the on-board hydrogen storage device before the start of hydrogen filling. The ambient temperature directly affects the hydrogen temperature in the on-board hydrogen storage device. For example, for every 1 K increase in the initial ambient temperature, the hydrogen temperature of the on-board hydrogen storage device also rises by about 1 K accordingly. Therefore, in the embodiment of the present invention, the initial ambient temperature of the on-board hydrogen filling device is also considered as an important parameter affecting the hydrogen filling process, and its application will be described in detail below and will not be repeated here.

In a preferred embodiment, the initial ambient temperature of the on-board hydrogen storage device can be detected by a temperature sensor (for example, a thermometer), and then a value of the initial hydrogen pressure detected by the pressure e sensor can be acquired.

Step S200, a filling rate and a target pressure of hydrogen filling are calculated according to the initial parameters.

The calculated filling rate and target pressure (also referred to as target filling pressure) enable the hydrogen temperature of the hydrogen filling process to be within a preset safe range. Here, enabling the hydrogen temperature of the hydrogen filling process to be within the preset safe range is equivalent to controlling the temperature rise of the on-board hydrogen storage device side in the hydrogen filling process to prevent a too fast temperature rise from causing hydrogen explosion. In the embodiment of the present invention, according to the requirement of the international standard, the hydrogen temperature in the on-board hydrogen storage device is controlled to be below 85° C. in the hydrogen filling process.

The filling rate is an important factor for fast hydrogen filling, and the target pressure is an important factor for determining the speed of temperature rise. Combining the filling rate and the target pressure to determine the hydrogen filling strategy can enable the hydrogen temperature to be within the preset safe range and also achieve fast hydrogen filling. Thus, in the embodiment of the present invention, the effects of the above initial parameters on the hydrogen filling process are taken into consideration, and the filling rate and the target pressure are calculated according to the initial parameters, thereby achieving the purpose of controlling the temperature rise and rate of the hydrogen filling process.

Figure 2:
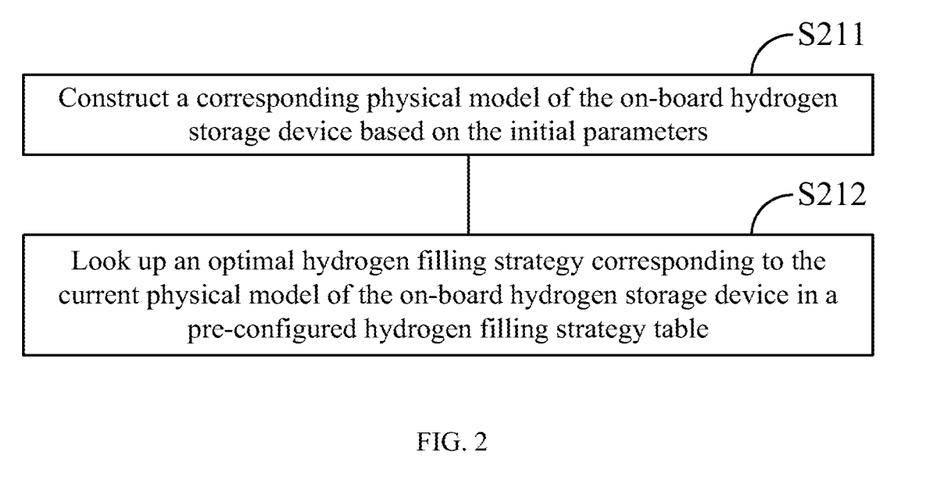
FIG. 2 is a schematic flow chart of a table lookup method according to the embodiment of the present invention.

In the embodiment of the present invention, a table lookup method is provided to calculate the filling rate and the target pressure according to the initial parameters. FIG. 2 is a schematic flow chart of the table lookup method according to the embodiment of the present invention. As shown in FIG. 2, the table lookup method can comprise the following steps:

Step S211, a corresponding physical model of the on-board hydrogen storage device is constructed based on the initial parameters.

The physical model here refers to a model constructed based on physical parameters for reflecting parameter characteristics of the on-board hydrogen storage device. As described above, when the initial parameters comprise the volume, the initial hydrogen pressure and the initial ambient temperature of the on-board hydrogen storage device, the corresponding physical model reflects the parameter characteristics of the on-board hydrogen storage device through these three parameters.

In the embodiment of the present invention, the volume, the initial hydrogen pressure and the initial ambient temperature of the on-board hydrogen storage device are selected. This is because based on the solution of the embodiment of the present invention, through these three parameters, it can be determined that the filling rate and the target pressure required by most models of on-board hydrogen storage devices, such as a conventional 35 Mpa hydrogen storage cylinder. However, for hydrogen storage cylinders of high hydrogen storage pressure, such as a hydrogen storage cylinder of 70 Mpa and above, the hydrogen temperature also needs to be considered when the filling rate and the target pressure are determined. Therefore, in other embodiments, the initial parameters can comprise a volume, an initial hydrogen pressure, an initial ambient temperature and an initial hydrogen temperature of the on-board hydrogen storage device. Further, in some scenarios that require particularly high filling accuracy, when the hydrogen filling strategy is determined, a material, a wall thickness, size information and the like of the on-board hydrogen storage device should also be considered (in most scenarios, these factors can be ignored). As for the material, its heat transfer coefficient will affect the temperature rise of the on-board hydrogen storage device. As for the wall thickness, the compressive strength of the wall will affect the pressure of the on-board hydrogen storage. The size information (such as diameter, length and the like) determines the shape of the on-board hydrogen storage device, and the shape of the on-board hydrogen storage device will affect its temperature distribution. Therefore, in other embodiments, in addition to the volume, the initial hydrogen pressure, the initial ambient temperature and the initial hydrogen temperature of the on-board hydrogen storage device, the initial parameters can also comprise the material, the wall thickness and the size information of the on-board hydrogen storage device.

Correspondingly, as the initial parameters are different, the correspondingly constructed physical models are also different, and those skilled in the art can determine the physical model according to the actual situation on site.

Step S212, an optimal hydrogen filling strategy corresponding to the current physical model of the on-board hydrogen storage device is looked up in a pre-configured hydrogen filling strategy table.

The hydrogen filling strategy table is configured according to historical hydrogen filling data of various hydrogen filling stations, and shows the mapping relationship between physical models of various on-board hydrogen storage devices and corresponding optimal hydrogen filling strategies. The optimal hydrogen filling strategy comprises determining the filling rate and the target pressure.

For example, for a hydrogen filling station, hydrogen filling data for filling various on-board hydrogen storage devices with hydrogen can be obtained through experiments. These hydrogen filling data comprise multiple sets of hydrogen filling rates and target pressures when different or the same type of hydrogen storage cylinders are filled with hydrogen by using different or the same type of initial parameters, so that the optimal set of hydrogen filling rate and target pressure can be selected therefrom to form the corresponding optimal hydrogen filling strategy. Then, the hydrogen filling strategy table is configured to reflect the mapping relationship between physical models of various on-board hydrogen storage devices and corresponding optimal hydrogen filling strategies. For example, in the hydrogen filling strategy table shown in Table 1, for a 10-15 kg on-board hydrogen storage device, in the case that the ambient temperature and the initial pressure are known, the optimal target pressure and filling rate can be looked up for hydrogen filling. In this way, the hydrogen filling station side can obtain the required filling rate and target pressure based on the obtained initial parameters (physical model) by matching.

TABLE 1

| Target pressure (MPa) 10-15 kg Ambient temperature (° C.) | Filling rate (MPa/s) | Initial pressure (MPa) | | | | |
|---|---|---|---|---|---|---|
| | | 0.5 | 3 | 12 | 24 | 35 |
| −30 | 1.8 | 42.4 | 41.8 | 40.1 | 38.5 | 36.7 |
| −10 | 1.4 | 43.6 | 42.6 | 41.4 | 39.9 | 38.3 |
| 0 | 0.9 | 41.9 | 43.1 | 42.0 | 40.8 | 39.4 |
| 30 | 0.4 | 42.5 | 41.6 | 40.6 | 39.6 | 38.5 |
| 50 | 0.3 | 42.1 | 43.3 | 42.3 | 41.4 | 40.5 |

It should be noted that the parameters shown in Table 1 are discontinuous. For example, for the ambient temperature, only the hydrogen filling strategies corresponding to −30° C. and −10° C. are shown, and the strategy parameters that should be selected corresponding to other parameters between −30° C. and −10° C. are not given. In this regard, in the embodiment of the present invention, for other parameters (for example, −20° C.) of the physical model of the on-board hydrogen storage device not shown in the table, the corresponding filling rate and target pressure can be calculated according to an interpolation method.

Step S300, a hydrogen filling station is controlled to fill the on-board hydrogen storage device with hydrogen to the calculated target pressure at the calculated filling rate.

Compared with the current domestic solution of reducing the filling rate by a flow-limiting valve, a pressure reducing valve or the like to directly perform filling to the target pressure, the filling rate is intelligently controlled herein, so that hydrogen filling to the target pressure can be achieved without deliberately reducing the filling rate, thereby ensuring the hydrogen filling efficiency. In conclusion, according to the embodiments of the present invention, the filling process is controlled by obtaining the filling rate and the target pressure based on the initial parameters, measured by the hydrogen filling station, of the on-board hydrogen storage device without the need for real-time communication between the hydrogen filling station and the vehicle, so the flow is simple and easy to implement, and the reliability of the hydrogen filling process is ensured. Further, in the embodiments of the present invention, the filling rate and the target pressure are calculated by the table lookup method, so the implementation manner is simple. Besides, the determined filling rate and target pressure conform to the optimal hydrogen filling strategy in historical experience, so the control accuracy is very high.

Embodiment II

Figure 3:
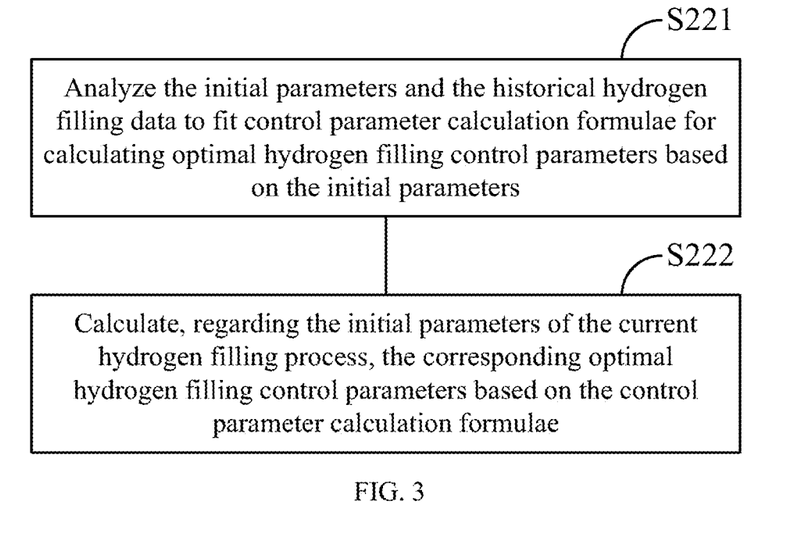
FIG. 3 is a schematic flow chart of a formula calculation method according to the embodiment of the present invention.

Embodiment II of the present invention is different from Embodiment I above mainly in the solution of calculating the filling rate and the target pressure according to the initial parameters in step S200. In the embodiment of the present invention, a formula calculation method is provided to calculate the filling rate and the target pressure according to the initial parameters. FIG. 3 is a schematic flow chart of the formula calculation method according to the embodiment of the present invention. As shown in FIG. 3, the formula calculation method can comprise the following steps:

Step S221, the initial parameters and the historical hydrogen filling data are analyzed to fit control parameter calculation formulae for calculating optimal hydrogen filling control parameters based on the initial parameters.

The optimal hydrogen filling control parameters comprise the filling rate and the target pressure.

For example, the historical hydrogen filling data can still be obtained through experiments, and each set of initial parameters and the corresponding filling rate and target pressure in the obtained historical hydrogen filling data are subjected to data processing, for example, by using each set of initial parameters and the corresponding filling rate and target pressure as variables of software Matlab, the software Matlab is utilized to perform drawing analysis to obtain the relationship between the variables, and the reglm, stepwise, nlinfit, regress and other formula fitting functions in software Matlab are utilized to fit the required control parameter calculation formulae. The software Matlab is exemplary, and other software with a formula fitting function can also be used.

Step S222, regarding the initial parameters of the current hydrogen filling process, the corresponding optimal hydrogen filling control parameters are calculated based on the control parameter calculation formulae.

For example, the formulae are as follows:

filling rate $Prr=f(P,T,V,T_{H2})$ target pressure $Ptarget=f(P0,P,V,T,\delta_m,)$ where P is the gas pressure measured near a shutoff valve of a hydrogen dispenser, P0 is the initial pressure, measured by the hydrogen dispenser, of the on-board hydrogen storage device, V is the volume of the on-board hydrogen storage device, T is the ambient temperature, $T_{H2}$ is the temperature of hydrogen to be filled, and $\delta_m$ is the mass of hydrogen measured by a mass flowmeter in the hydrogen dispenser in a unit time interval.

Based on the formulae, the optimal filling rate and target pressure can be calculated.

It can be seen that in Embodiment I, the filling rate and the target pressure determined by the table lookup method are fixed. Although the control accuracy is high, the flexibility is insufficient, and the lookup process involves lots of data, which affects the control speed. In this regard, in the embodiment of the present invention, the formula calculation method is adopted to calculate the filling rate and the target pressure. Although the control accuracy may not be as good as the table lookup method, its calculation speed is high, which is beneficial to increasing the overall control speed, and the filling rate can be adjusted by the formula calculation result, which realizes dynamic control on the state of the on-board hydrogen storage device.

Embodiment III

Figure 4:
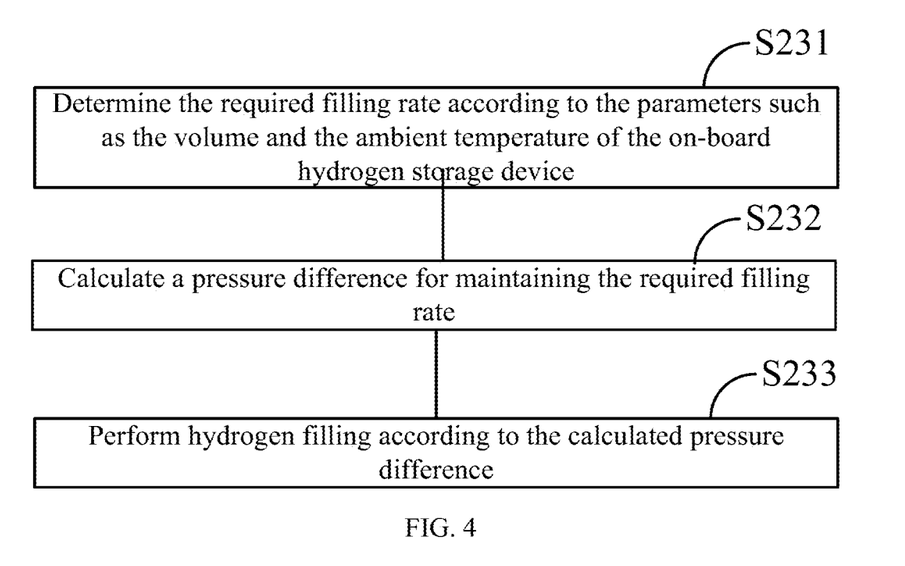
FIG. 4 is a schematic flow chart of a pressure difference calculation method according to the embodiment of the present invention.

Embodiment III is different from the two embodiments above mainly in the solution of calculating the filling rate and the target pressure according to the initial parameters in step S200. In the embodiment of the present invention, a pressure difference calculation method is provided to calculate the filling rate and the target pressure according to the initial parameters. FIG. 4 is a schematic flow chart of the pressure difference calculation method according to the embodiment of the present invention. As shown in FIG. 4, the pressure difference calculation method can comprise the following steps:

Step S231, the required filling rate is determined according to the parameters such as the volume and the ambient temperature of the on-board hydrogen storage device.

Values of the obtained parameters such as the volume and the ambient temperature of the on-board hydrogen storage device can be measured at the hydrogen dispenser side.

Step S232, a pressure difference for maintaining the required filling rate is calculated.

The hydrogen dispenser can calculate the pressure difference for maintaining the filling rate based on the required filling rate so that the filling process can proceed smoothly.

Step S233, hydrogen filling is performed according to the calculated pressure difference.

The pressure difference is the difference between the pressure of the hydrogen storage source at the front end of a pressure regulating valve of the hydrogen filling station and the pressure of the pressure sensor at the outlet of the hydrogen dispenser. When the reading of the mass flowmeter reaches the target pressure difference, the hydrogen dispenser stops filling.

Compared with the two embodiments above, the embodiment of the present invention adopts the pressure difference calculation method to calculate the filling rate and the target pressure. The pressure difference calculation method is higher in calculation speed and can also realize dynamic control on the state of the on-board hydrogen storage device, but the accuracy is slightly lower.

Embodiment IV

Figure 5:
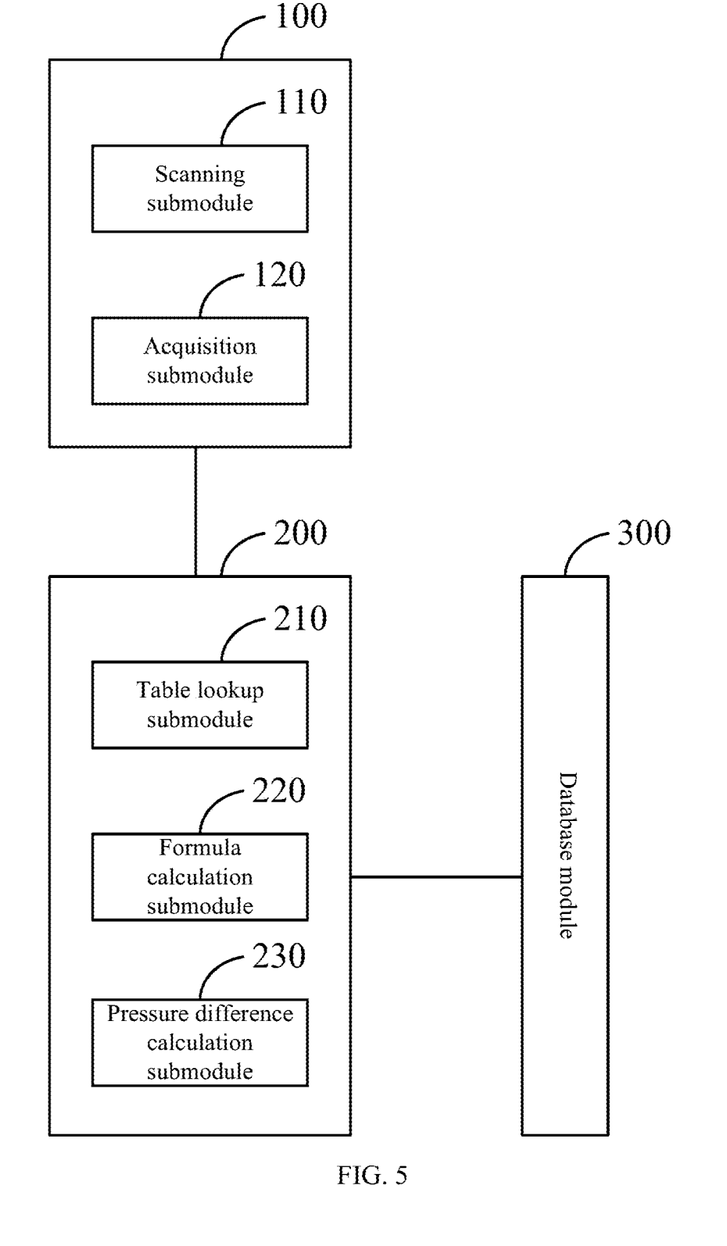
FIG. 5 is a structural schematic diagram of a hydrogen filling control device according to an embodiment of the present invention.

Based on the same inventive idea as the three embodiments above, Embodiment IV of the present invention provides a hydrogen filling control device. FIG. 5 is a structural schematic diagram of the hydrogen filling control device according to the embodiment of the present invention. As shown in FIG. 5, the hydrogen filling control device can comprise: an initial parameter acquisition module 100, used for acquiring initial parameters of an on-board hydrogen storage device, the initial parameters comprising a volume, an initial hydrogen pressure and an initial ambient temperature of the on-board hydrogen storage device; a target parameter calculation module 200, used for calculating a filling rate and a target pressure of hydrogen filling according to the initial parameters, wherein the calculated filling rate and target pressure enable a hydrogen temperature of a hydrogen filling process to be within a preset safe range; and a control module 300, used for controlling a hydrogen filling station to fill the on-board hydrogen storage device with hydrogen to the calculated target pressure at the calculated filling rate.

In a preferred embodiment, the initial parameter acquisition module 100 can comprise: a scanning submodule 110, used for scanning a tag on the on-board hydrogen storage device to read volume information, stored in the tag, of the on-board hydrogen storage device; or an acquisition submodule 120, used for acquiring the initial hydrogen pressure and the initial ambient temperature respectively detected by a pressure sensor and a temperature sensor.

For example, when the tag in the form of a QR code is attached to the on-board hydrogen storage device, the scanning submodule 110 can be, for example, a code scanning function module applied to a mobile phone or a computer. The acquisition submodule 120 can be a conventional input function module or a receiving function module. The input function module can realize manual input of the initial hydrogen pressure and the initial ambient temperature detected by the sensors into the controller at the hydrogen filling station side. The receiving function module can receive the initial hydrogen pressure and the initial ambient temperature detected by the sensors from the sensors, for example, via Bluetooth or the like.

In a preferred embodiment, the initial parameters can further comprise the hydrogen temperature of the on-board hydrogen storage device. In a more preferred embodiment, the initial parameters can further comprise a material, a wall thickness and size information of the on-board hydrogen storage device. The hydrogen temperature can be obtained by configuring a temperature sensor, and the material, wall thickness, size information and the like of the on-board hydrogen storage device can be stored in the tag as the equipment information of the on-board hydrogen storage device together with the volume of the on-board hydrogen storage device above.

In a preferred embodiment, the calculation module 200 can comprise any one of submodules as follows:

- a table lookup submodule 210, configured to: construct a corresponding physical model of the on-board hydrogen storage device based on the initial parameters; and look up an optimal hydrogen filling strategy corresponding to the current physical model of the on-board hydrogen storage device in a pre-configured hydrogen filling strategy table, wherein the hydrogen filling strategy table is configured according to historical hydrogen filling data of various hydrogen filling stations, and shows the mapping relationship between physical models of various on-board hydrogen storage devices and corresponding optimal hydrogen filling strategies, wherein the optimal hydrogen filling strategy comprises determining the filling rate and the target pressure;
- a formula calculation submodule 220, configured to: analyze the initial parameters and the historical hydrogen filling data to fit control parameter calculation formulae for calculating optimal hydrogen filling control parameters based on the initial parameters, wherein the optimal hydrogen filling control parameters comprise the filling rate and the target pressure; and calculate, regarding the initial parameters of the current hydrogen filling process, the corresponding optimal hydrogen filling control parameters based on the control parameter calculation formulae; and a pressure difference calculation submodule 230, configured to: determine the required filling rate according to the parameters such as the volume and the ambient temperature of the on-board hydrogen storage device; calculate a pressure difference for maintaining the required filling rate; and perform hydrogen filling according to the calculated pressure difference.

Corresponding to the table lookup submodule 210 and the formula calculation submodule 220, the hydrogen filling control device can further comprise: a database module 300, used for storing the historical hydrogen filling data, the hydrogen filling strategy table and the control parameter calculation formulae.

For other implementation details and effects of Embodiment VI, reference can be made to Embodiment I to Embodiment III described above, and details are not repeated here.

Embodiment V

The embodiment of the present invention provides a machine-readable storage medium. The machine-readable storage medium stores an instruction for making a machine execute the above hydrogen filling control method in any one of Embodiment I to Embodiment III.

The machine is, for example, a controller, which is arranged at the hydrogen filling station side and can be a PLC (Programmable Logic Controller), but in other embodiments, the controller can also be a single-chip microcomputer or a DSP (Digital Signal Processor), an SOC (System on a Chip) and other program controllers.

Further, the embodiment of the present invention further provides processor for running a program. The program is used for executing the above hydrogen filling control methods in Embodiment I to Embodiment III when being run.

Further, the embodiment of the present invention further provides computer equipment, comprising: one or more processors; and a memory, used for storing one or more programs, wherein when the one or more programs are executed by the one or more processors, the one or more processors are made to implement the above hydrogen filling control methods in Embodiment I to Embodiment III. The processor is, for example, a CPU. The memory can comprise a volatile memory, a random access memory (RAM) and/or a non-volatile memory in a computer-readable medium, such as a read-only memory (ROM) or a flash memory (flash RAM). The memory is an example of the computer-readable medium.

For other implementation details and effects of Embodiment V, reference can be made to any embodiment above, and details are not repeated here.

Application Example

Figure 6:
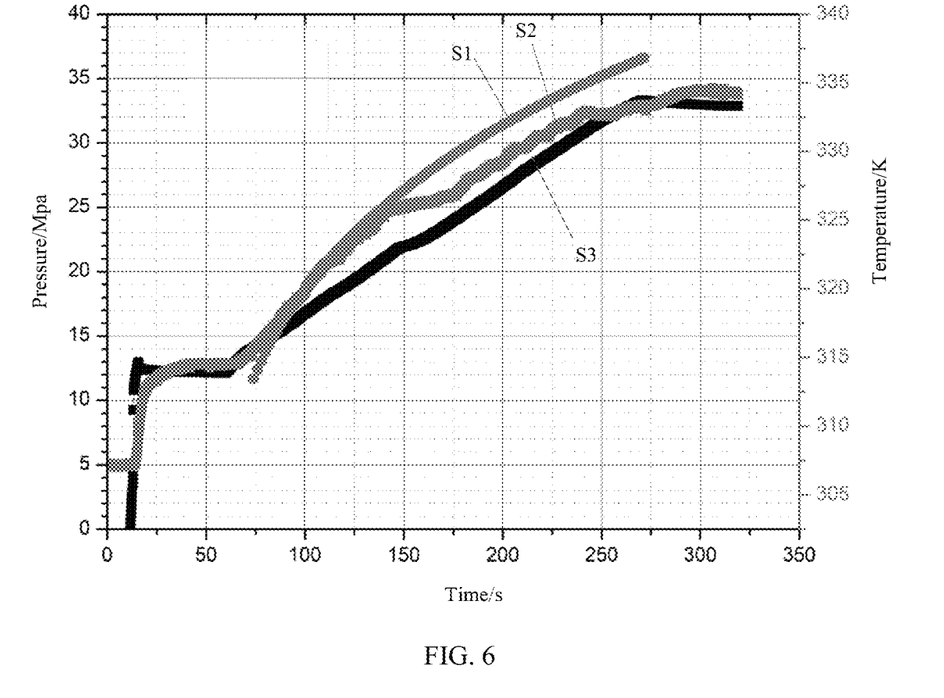
FIG. 6 is an example effect diagram of hydrogen filling by using the table lookup method according to the embodiment of the present invention.

FIG. 6 is an example effect diagram of hydrogen filling by using the table lookup method according to the embodiment of the present invention. S1 reflects the corresponding relationship between temperature, pressure and time in the filling process obtained by the table lookup method, S2 is the measured temperature curve, and S3 is the measured pressure curve. It can be seen from FIG. 6 that the target temperature difference of the measured temperature (curve S2) using the table lookup method (curve S1) is 3 K, which is within the normal error range, and in the hydrogen filling process, the measured temperature is usually lower than the temperature determined by the table lookup method, that is, the measured temperature is controlled to be not too high, which is beneficial to ensuring the hydrogen filling safety. In addition, by comparing S1 with S3, it can be seen that when reaching the same pressure value (for example, 30 Mpa) of filling, the time used by the table lookup method is shorter, which helps to improve the hydrogen filling efficiency.

Further, using a curve comparison similar to that of FIG. 6, the formula calculation method and the pressure difference method involved in the above embodiments can also achieve good filling effects.

Optional implementations of the embodiments of the present invention have been described in detail above in conjunction with the accompanying drawings, but the embodiments of the present invention are not limited to the specific details in the above implementations. Various simple variations can be made to the technical solutions of the embodiments of the present invention within the scope of the technical idea of the embodiments of the present invention, and these simple variations are all within the protection scope of the embodiments the present invention.

It should be further noted that the specific technical features described in the above specific implementations may be combined in any suitable manner in the case of no contradiction. In order to avoid unnecessary repetition, the embodiments of the present invention will not be further described in various possible combinations.

Those skilled in the art can understand that all or part of the steps in the method of the above embodiments can be implemented by instructing relevant hardware through a program. The program is stored in a storage medium, and comprises several instructions to enable the single-chip microcomputer, chip or processor to execute all or part of the steps of the method in the embodiments of the present invention. The foregoing storage medium comprises: a USB flash disk, a mobile hard disk, a read-only memory (ROM), a random access memory (RAM), a magnetic disk, an optical disk, or any medium that can store program codes.

In addition, any combination of the various implementations of the embodiments of the present invention can be made as long as it does not deviate from the idea of the embodiments of the present invention, and it should also be regarded as the contents disclosed by the embodiments of the present invention.

What is claimed is:

1. A hydrogen filling control method, comprising:
   acquiring initial parameters of an on-board hydrogen storage device, the initial parameters comprising a volume, an initial hydrogen pressure of the on-board hydrogen storage device, and an initial ambient temperature;
   calculating a filling rate and a target pressure of hydrogen filling according to the initial parameters, wherein the calculated filling rate and target pressure enable a hydrogen temperature of a hydrogen filling process to be within a preset safe range; and
   controlling a hydrogen filling station to fill the on-board hydrogen storage device with hydrogen to the calculated target pressure at the calculated filling rate,
   wherein the target pressure is the pressure of the hydrogen storage device when the hydrogen filling process is finished, and
   wherein the calculating a filling rate and a target pressure of hydrogen filling comprises:
   calculating the filling rate and the target pressure by using a formula calculation method, comprising: analyzing the initial parameters and the historical hydrogen filling data to fit control parameter calculation formulae for calculating optimal hydrogen filling control parameters based on the initial parameters, wherein the optimal hydrogen filling control parameters comprise the filling rate and the target pressure; and calculating, regarding the initial parameters of a current hydrogen filling process, the corresponding optimal hydrogen filling control parameters based on the control parameter calculation formulae.

2. The hydrogen filling control method according to claim 1, wherein the acquiring initial parameters of an on-board hydrogen storage device comprises:
   scanning a tag on the on-board hydrogen storage device to read volume information, stored in the tag, of the on-board hydrogen storage device; and/or
   acquiring the initial hydrogen pressure and the initial ambient temperature respectively detected by a pressure sensor and a temperature sensor.

3. The hydrogen filling control method according to claim 1, wherein the initial parameters further comprise a hydrogen temperature of the on-board hydrogen storage device.

4. The hydrogen filling control method according to claim 3, wherein the initial parameters further comprise a material, a wall thickness and size information of the on-board hydrogen storage device.

5. A machine-readable storage medium, wherein the machine-readable storage medium stores an instruction for making a machine execute a hydrogen filling control method wherein, the hydrogen filling control method comprises:
   acquiring initial parameters of an on-board hydrogen storage device, the initial parameters comprising a volume, an initial hydrogen pressure of the on-board hydrogen storage device, and an initial ambient temperature;
   calculating a filling rate and a target pressure of hydrogen filling according to the initial parameters, wherein the calculated filling rate and target pressure enable a hydrogen temperature of a hydrogen filling process to be within a preset safe range; and
   controlling a hydrogen filling station to fill the on-board hydrogen storage device with hydrogen to the calculated target pressure at the calculated filling rate,
   wherein the target pressure is the pressure of the hydrogen storage device when the hydrogen filling process is finished, and
   wherein the calculating a filling rate and a target pressure of hydrogen filling comprises:
   calculating the filling rate and the target pressure by using a formula calculation method, comprising: analyzing the initial parameters and the historical hydrogen filling data to fit control parameter calculation formulae for calculating optimal hydrogen filling control parameters based on the initial parameters, wherein the optimal hydrogen filling control parameters comprise the filling rate and the target pressure; and calculating, regarding the initial parameters of a current hydrogen filling process, the corresponding optimal hydrogen filling control parameters based on the control parameter calculation formulae.

6. The machine-readable storage medium according to claim 5, wherein the acquiring initial parameters of hydrogen filling of an on-board hydrogen storage device comprises:
   scanning a tag on the on-board hydrogen storage device to read volume information, stored in the tag, of the on-board hydrogen storage device; and/or
   acquiring the initial hydrogen pressure and the initial ambient temperature respectively detected by a pressure sensor and a temperature sensor.

7. The machine-readable storage medium according to claim 5, wherein the initial parameters further comprise a hydrogen temperature of the on-board hydrogen storage device.

8. The machine-readable storage medium according to claim 7, wherein the initial parameters further comprise a material, a wall thickness and size information of the onboard hydrogen storage device.

9. A processor, being used for running a program, wherein the program is used for executing a hydrogen filling control method when being run;
   wherein, the hydrogen filling control method comprises:
   acquiring initial parameters of an on-board hydrogen storage device, the initial parameters comprising a volume, an initial hydrogen pressure of the on-board hydrogen storage device, and an initial ambient temperature;

calculating a filling rate and a target pressure of hydrogen filling according to the initial parameters, wherein the calculated filling rate and target pressure enable a hydrogen temperature of a hydrogen filling process to be within a preset safe range; and controlling a hydrogen filling station to fill the on-board hydrogen storage device with hydrogen to the calculated target pressure at the calculated filling rate, wherein the target pressure is the pressure of the hydrogen storage device when the hydrogen filling process is finished, and wherein the calculating a filling rate and a target pressure of hydrogen filling comprises:

calculating the filling rate and the target pressure by using a formula calculation method:

comprising: analyzing the initial parameters and the historical hydrogen filling data to fit control parameter calculation formulae for calculating optimal hydrogen filling control parameters based on the initial parameters, wherein the optimal hydrogen filling control parameters comprise the filling rate and the target pressure; and calculating, regarding the initial parameters of a current hydrogen filling process, the corresponding optimal hydrogen filling control parameters based on the control parameter calculation formulae.

10. The processor according to claim 9, wherein the acquiring initial parameters of hydrogen filling of an on-board hydrogen storage device comprises:

scanning a tag on the on-board hydrogen storage device to read volume information, stored in the tag, of the on-board hydrogen storage device; and/or acquiring the initial hydrogen pressure and the initial ambient temperature respectively detected by a pressure sensor and a temperature sensor.

11. The processor according to claim 9, wherein the initial parameters further comprise a hydrogen temperature of the on-board hydrogen storage device.

12. The processor according to claim 11, wherein the initial parameters further comprise a material, a wall thickness and size information of the on-board hydrogen storage device.

* * * * *